(12) United States Patent
Meijer et al.

(10) Patent No.: US 7,818,719 B2
(45) Date of Patent: Oct. 19, 2010

(54) EXTENDING EXPRESSION-BASED SYNTAX FOR CREATING OBJECT INSTANCES

(75) Inventors: Henricus Johannes Maria Meijer, Mercer Island, WA (US); Anders Hejlsberg, Seattle, WA (US); Matthew J. Warren, Redmond, WA (US); Luca Bolognese, Redmond, WA (US); Peter A. Hallam, Seattle, WA (US); Gary S. Katzenberger, Woodinville, WA (US); Dinesh C. Kulkarni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1171 days.

(21) Appl. No.: 11/193,584

(22) Filed: Jul. 29, 2005

(65) Prior Publication Data

US 2007/0028212 A1 Feb. 1, 2007

(51) Int. Cl.
*G06F 9/44* (2006.01)
*G06F 9/45* (2006.01)

(52) U.S. Cl. .................... 717/116; 717/114; 717/143

(58) Field of Classification Search ................ 717/116, 717/143

See application file for complete search history.

(56) References Cited

U.S. PATENT DOCUMENTS

| | | | |
|---|---|---|---|
| 5,913,064 A * | 6/1999 | Chen | 717/108 |
| 5,995,753 A * | 11/1999 | Walker | 717/108 |
| 6,085,034 A * | 7/2000 | Danforth | 717/108 |
| 6,690,981 B1 | 2/2004 | Kawachi et al. | |
| 6,857,118 B2 | 2/2005 | Karr et al. | |
| 6,993,529 B1 | 1/2006 | Basko et al. | |
| 7,047,249 B1 | 5/2006 | Vincent | |
| 7,185,016 B1 | 2/2007 | Rasmussen | |
| 7,194,485 B2 | 3/2007 | Kaipa | |
| 7,340,720 B2 * | 3/2008 | Halstead et al. | 717/108 |
| 2004/0098384 A1 | 5/2004 | Min et al. | |
| 2004/0139423 A1 * | 7/2004 | Boehm et al. | 717/116 |
| 2004/0148592 A1 | 7/2004 | Vion-Dury | |
| 2004/0210828 A1 | 10/2004 | Langer | |

(Continued)

OTHER PUBLICATIONS

Woychowsky, 2002, Create your own collection objects in JavaScript, http://articles.techrepublic.com.com/5100-10878_11-1044659.html).*

(Continued)

*Primary Examiner*—Lewis A Bullock, Jr.
*Assistant Examiner*—Hang Pan
(74) *Attorney, Agent, or Firm*—Workman Nydegger

(57) ABSTRACT

Syntax for creating object instances utilizing expressions instead of statements. A syntax component facilitates extension of conventional object-creation-expression syntax. An initializer component provides for initialization of a newly-created entity via object and collection initializers. The initializer component provides initialization of the newly-created entity utilizing an object initializer where the object initializer specifies values for one or more fields or properties of the newly-created entity which is an object, and consists of a sequence of member initializers enclosed by tokens and separated by commas. The initializer component can also provides initialization of the newly-created entity utilizing a collection initializer when the underlying object implements a certain interface or implements a certain pattern. An overloading constructor can be called as part of the initialization process. In another aspect, code inferencing is disclosed whereby given a type, the corresponding code can be inferred by the compiler and inserted for compiling by a compiler.

16 Claims, 15 Drawing Sheets

U.S. PATENT DOCUMENTS

| | | | |
|---|---|---|---|
| 2004/0230584 | A1 | 11/2004 | Nouri |
| 2004/0243921 | A1 | 12/2004 | Carr et al. |
| 2004/0260691 | A1 | 12/2004 | Desai et al. |
| 2005/0027681 | A1 | 2/2005 | Bernstein et al. |
| 2005/0055336 | A1 | 3/2005 | Hui et al. |
| 2005/0138073 | A1 | 6/2005 | Zhou et al. |
| 2005/0216508 | A1 | 9/2005 | Meijer |
| 2006/0179068 | A1 | 8/2006 | Warner et al. |
| 2006/0200438 | A1 | 9/2006 | Schloming |
| 2007/0027862 | A1 | 2/2007 | Meijer |
| 2007/0067716 | A1 | 3/2007 | Jung et al. |

OTHER PUBLICATIONS

Dave, Using Named Parameters in Constructors, (dated 2001 using archive.org) http://web.archive.org/web/20010422044251/http://www.cs.cf.ac.uk/Dave/PERL/node126.html.*

Sun Microsystems (JAVA Language specification, URL: http://72.5.124.55/docs/books/jls/first_edition/html/12.doc.html, 1996, retrieved on Jul. 15, 2009).*

Woychowsky (Create your own collection objects in JavaScript, http://articles.techrepublic.com.com/5100-10878_11-1044659.html, 2002, retrieved on Apr. 10, 2009).*

Michael (Java Parameters, URL: http://web.archive.org/web/20001007052051/http://www.cs.colorado.edu/~main/lab/javaparm.html, 2000, retrieved on Sep. 10, 2009).*

Dave (Using Named Parameters in Constructors, dated 2002, http://web.archive.org/web/20020209132349/http://www.cs.cf.ac.uk/Dave/PERL/node126.html, retrieved on Jan. 14, 2010).*

U.S. Appl. No. 11/193,574, filed Jul. 29, 2005, Meijer, et al.

U.S. Appl. No. 11/193,573, filed Jul. 29, 2005, Warren, et al.

U.S. Appl. No. 11/193,787, filed Jul. 29, 2005, Meijer, et al.

U.S. Appl. No. 11/019,335, filed Dec. 21, 2004, Sonkin, et al.

Vieira et al. "XVerter: Querying XML Data with OR-DBMS," AMD 2003, Nov. 7, 2003, 8 pages, New Orleans, Louisiana.

Bonifati et al. "Pushing Reactive Services to XML Repositories Using Active Rules," ACM 2001, May 1, 2001, 9 pages, Hong Kong.

Sundaresan et al. "Algorithms and Programming Models for Efficient Representation of XML for Internet Applications," ACM 2001, May 1, 2001, 10 pages, Hong Kong.

Abelson, et al., Structure and Interpretbn of Computer programs. The Rules of Evaluation [online], Cambridge, MA: The MIT Press. 1996 [retrieved on Jan. 30, 2007]. Retrieved from the Internet: CURL:http:llmitpress.mit.edu/sicp/full-text/sicp/book/node56.html>,(chapter 3.2.1).

Barcndrfgt, The Impact of the Lambda Calculus and Computer Science, The Bulletin of Symbolic Logic [online], Jun. 1997 [retrieved on Jan. 30, 2007] Retrieved from the Internet:<UPL;https://www.mcs.vuw.ac.nz/courses/COMP432/2006T2/docs/BarLambda.pdf>.

International Search Report dated Mar. 1, 2007 for PCT Application Serial No. PCT/US 06/24567, 2 Pages.

International Search Report dated Sep. 17, 2007 for PCT Application Serial No. PCT/US 06/24567, 3 Pages.

C#: Overview of C# 3.0, Draft 2, Jul. 2005, 18 pages.

Notice of Allowance dated Mar. 1, 2010 cited in U.S. Appl. No. 11/193,601.

Office Action dated Nov. 14, 2007 cited in U.S. Appl. No. 11/193,601.

Office Action dated May 1, 2008 cited in Application No. 11/193,601.

Office Action dated Aug. 7, 2008 cited in U.S. Appl. No. 11/193,601.

Office Action dated Jan. 23, 2009 cited in U.S. Appl. No. 11/193,601.

Office Action dated Jun. 11, 2009 cited in U.S. Appl. No. 11/193,601.

* cited by examiner object-creation-expression:
    new type (argument-list$_{opt}$) object-or-collection-initializer$_{opt}$
object-or-collection-initializer:
    object-initializer
    collection-initializer

*FIG. 4* object-creation-expression:
    new type object-or-collection-initializer
object-or-collection-initializer:
    object-initializer
    collection-initializer

*FIG. 5* object-creation-expression:
    new type (argument-list$_{opt}$) object-initializer$_{opt}$
object-initializer:
    object-initializer

*FIG. 6* object-creation-expression:
    new type (argument-list$_{opt}$) collection-initializer$_{opt}$
collection-initializer:
    collection-initializer

*FIG. 7* object-creation-expression:
    new type (argument-list$_{opt}$) object-and-collection-initializer$_{opt}$
object-and-collection-initializer:
    object-initializer
    collection-initializer

*FIG. 8* object-initializer:
    { member-initializer-list$_{opt}$ }
    { member-initializer-list , }
member-initializer-list:
    member-initializer
    member-initializer-list , member-initializer
member-initializer:
    simple-name
    member-access
    identifier = initializer-value
initializer-value:
    expression
    object-or-collection-initializer

*FIG. 9* collection-initializer:
    { element-initializer-list$_{opt}$ }
    { element-initializer-list , }
element-initializer-list:
    element-initializer
    element-initializer-list , element-initializer
element-initializer:
    initializer-value

*FIG. 12* array-initializer:
    collection-initializer

EXTENDING EXPRESSION-BASED SYNTAX FOR CREATING OBJECT INSTANCES

BACKGROUND

Programming languages continue to evolve to facilitate specification by programmers as well as efficient execution. In the early days of computer languages, low-level machine code was prevalent. With machine code, a computer program or instructions comprising a computer program were written with machine languages or assembly languages and executed by the hardware (e.g., microprocessor). These languages provided an efficient means to control computing hardware, but were very difficult for programmers to comprehend and develop sophisticated logic.

Subsequently, languages were introduced that provided various layers of abstraction. Accordingly, programmers could write programs at a higher level with a higher-level source language, which could then be converted via a compiler or interpreter to the lower level machine language understood by the hardware. Further advances in programming have provided additional layers of abstraction to allow more advanced programming logic to be specified much quicker then ever before. However, these advances do not come without a processing cost.

Compilers and/or interpreters bear the burden of translating high-level logic into executable machine code. In general, a compilers and/or interpreters are components that receive a program specified in a source programming language (e.g., C, C#, Visual Basic, Java, . . . ) and covert the logic provided thereby to machine language that is executable by a hardware device. However, the conversion need not be done verbatim. In fact, conventional compilers and/or interpreters analyze the source code and generate very efficient code. For example, programmers write code that sets forth a logical flow of operations that is intuitive and easy for humans to understand, but is often inefficient for a computer to execute. Compilers and/or interpreters can identify inefficiencies and improve program performance at the hardware level by eliminating unnecessary operations and/or rearranging the execution of instructions while still achieving the intended results. In this manner, programmers can create robust and efficient software programs.

Within the realm of a programming language such as C#, object instances can be created by calling constructor functions and then recursively assigning object instances to the children of the just created objects. A problem with this style of object creation is that it is statement based rather than expression based, and moreover that it is extremely tedious, since it requires the programmer to explicitly define imperative statements to build a complex object instance. Even in the case where object constructors take arguments, traditional object construction remains inconvenient, since it either requires the designer of the object to expose potentially $2^n$ overloads, where n is the number of parameters of different type. However, if there are m parameters, it means that $2^m$-$2^n$ combinations cannot be defined using overloading. Moreover, in addition to tedious and inefficient statement programming, compiler execution can become severely impacted, further reducing efficiency.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Provided herein is convenient syntax for creating complex object instances utilizing expressions, instead of statements as in conventional implementations. This facilitates more efficient programming and compiler time execution. In support thereof, a system is disclosed that includes a syntax component which facilitates extension of conventional object-creation-expression syntax. An initializer component provides for initialization of a newly-created entity via object and collection initializers. The newly-created entity can include an object and/or a collection. The initializer component provides initialization of the newly-created entity utilizing an object initializer where the object initializer specifies values for one or more fields or properties of the newly-created entity which is an object, and consists of a sequence of member initializers enclosed by tokens and separated by commas. The initializer component can also provides initialization of the newly-created entity utilizing a collection initializer. Collection initializers can be employed when the underlying object implements a predetermined pattern that logically allows adding elements to the collection.

In another aspect, the syntax component and initializer component together facilitate convenient syntax that at least reduces or eliminates overloading in object construction. A normal possibly overloaded parameterized constructor can be called as part of the initialization process as well as a default parameterless constructor.

In another aspect, code inferencing is disclosed whereby given a type, the corresponding code can be inferred by the compiler and inserted for compiling by a compiler. This has a significant impact on programming and compiler efficiencies. Code that can be inferred includes constructor calls for nested object and collection initializers and member names for projection initializers.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 4 illustrates an exemplary extended syntax in accordance with an aspect of the innovation.

FIG. 5 illustrates an exemplary syntax without the constructor argument list in accordance with an aspect.

FIG. 6 illustrates an exemplary extended syntax that employs optional object-initializer syntax in accordance with an aspect.

FIG. 7 illustrates an exemplary extended syntax that employs optional collection-initializer syntax in accordance with an aspect.

FIG. 8 illustrates an exemplary extended syntax that employs optional object-and-collection-initializer syntax in accordance with an aspect.

FIG. 9 illustrates exemplary syntax for an object initializer and member initializer.

FIG. 12 illustrates exemplary syntax for a collection initializer and element initializer.

DETAILED DESCRIPTION

Figure 1:
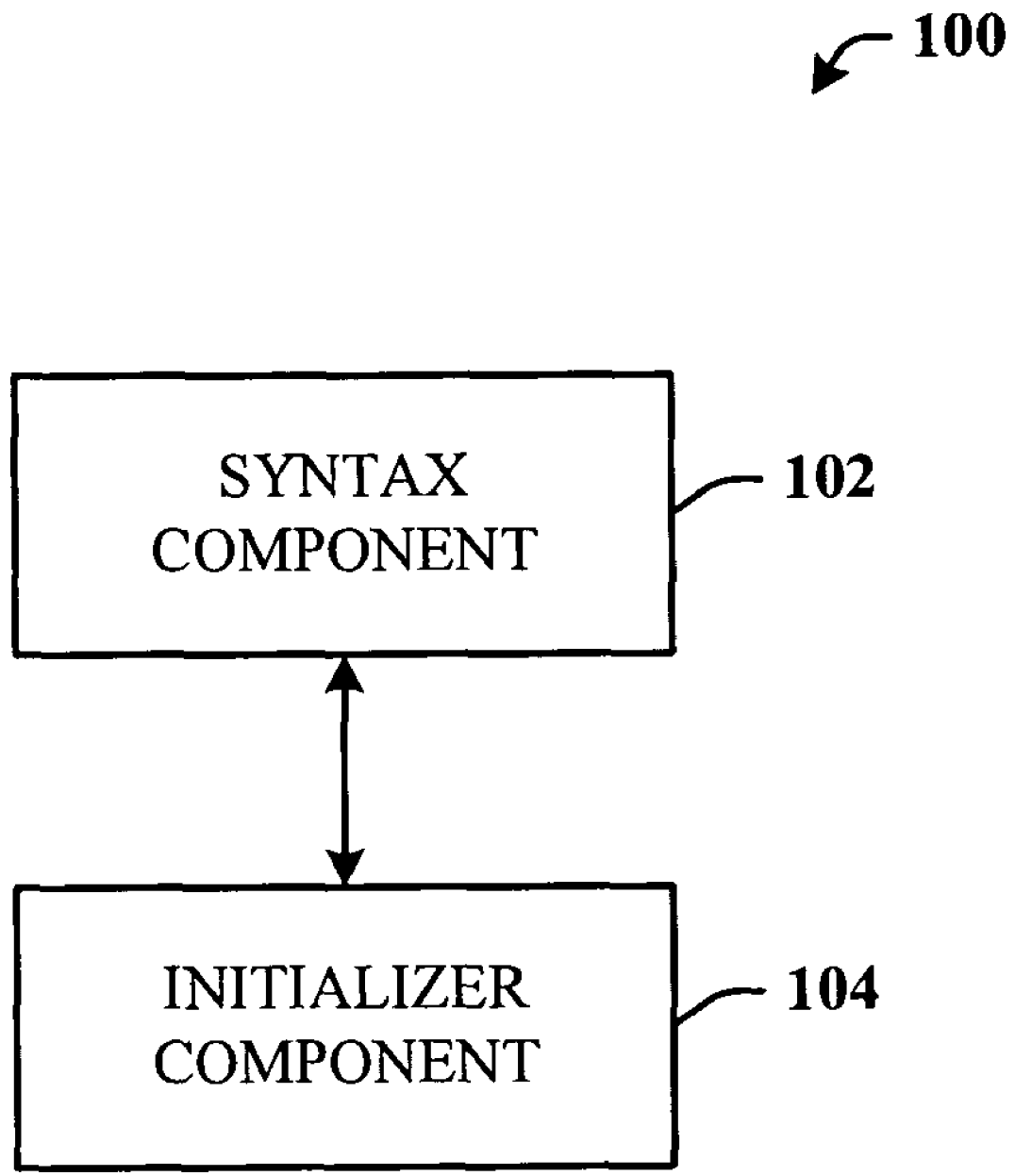
FIG. 1 illustrates a system that employs object initializers for the creation of object instances in accordance with the disclosed innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that employs object initializers for the creation of object instances in accordance with the disclosed innovation. The system 100 includes a syntax component 102 that facilitates extension of object-creation-expression syntax. An initializer component 104 provides for initialization of a newly-created entity. The newly-created entity can include an object and/or a collection. The initializer component 104 provides initialization of the newly-created entity utilizing an object initializer where the object initializer specifies values for one or more fields or properties of the newly-created entity which is an object, and consists of a sequence of member initializers enclosed by tokens and separated by commas. The initializer component 104 can also provide initialization of the newly-created entity utilizing a collection initializer.

Together, the syntax component 102 and initializer component 104 facilitate convenient syntax that reduces or eliminates overloading in object construction. The system 100 facilitates a capability to call an overloading constructor as part of the initialization process.

Code inferencing is provided, for example, as in new Line{p1={x=x1, y=y1}, p2={x=x2, y=y2}} where the compiler inserts code for constructor calls for nested object construction new Line{p1=new Point{x=x1, y=y1}, p2=new Point{x=x2, y=y2}} and as in projection initializers Point{x, y}, where the compiler inserts the omitted member names Point{x=x, y=y}. Furthermore, collection initializers can be employed when the underlying object implements a certain interface or implements a certain pattern.

Conventionally, an object-creation-expression is used to create a new instance of a class-type or a value-type, and is of the following form:

--- object-creation-expression:
    new    type    ( argument-list$_{opt}$ )

---

With respect to object and collection initializers, the new operator is used to create new instances of types. This innovation extends the existing object-creation-expression syntax such that it can include an optional object-or-collection-initializer which initializes of the members of the newly created object or the elements of the newly created collection. The new syntax can take the following form:

--- object-creation-expression:
    new    type    (argument-list$_{opt}$)   object-or-collection-initializer$_{opt}$
    new    type    object-or-collection-initializer
object-or-collection-initializer:
    object-initializer
    collection-initializer

---

An object initializer allows a programmer to create objects on-the-fly, possibly in the middle of an expression. The syntax allows the creation to be performed in three separate ways. The first form is used when the object to be created does not support a parameterless constructor. For example, if the only constructor exposed by the Customer class is Customer (string id, string name), then a Customer object can be created as follows:

---

Customer c = new Customer("ALFKI", "Bob")
    { City = "Portland", State = "OR"};

---

This is equivalent to the following:

```
Customer c = new Customer("ALFKI", "Bob");
c.City = "Portland";
c.State = "OR";
```

The second form is used when the class exposes a parameterless constructor. This is how an Order object can be constructed using this new syntax:

```
Order o = new Order { OrderID = 35, CustomerID = "ALFKI"};
```

The third form is used to construct collections. It requires that the object to be created implements ICollection<T> or any other interface or pattern that logically allows adding elements to the collection. In the following code a collection of ints is created:

```
List<int> intList = {1, 2, 3, 4, 5};
```

This is equivalent to creating the collection and calling Add for all the parameters. Object initializers can be nested to create an entire graph of objects in a concise way. For example the following fragment creates a Customer object:

```
Customer c = new Customer {
    Name = "Bob",
    Address = {
        Street = "134 NE 76th",
        City = "London"
    },
    CustomerID = "ALFKI"
}
```

Figure 2:
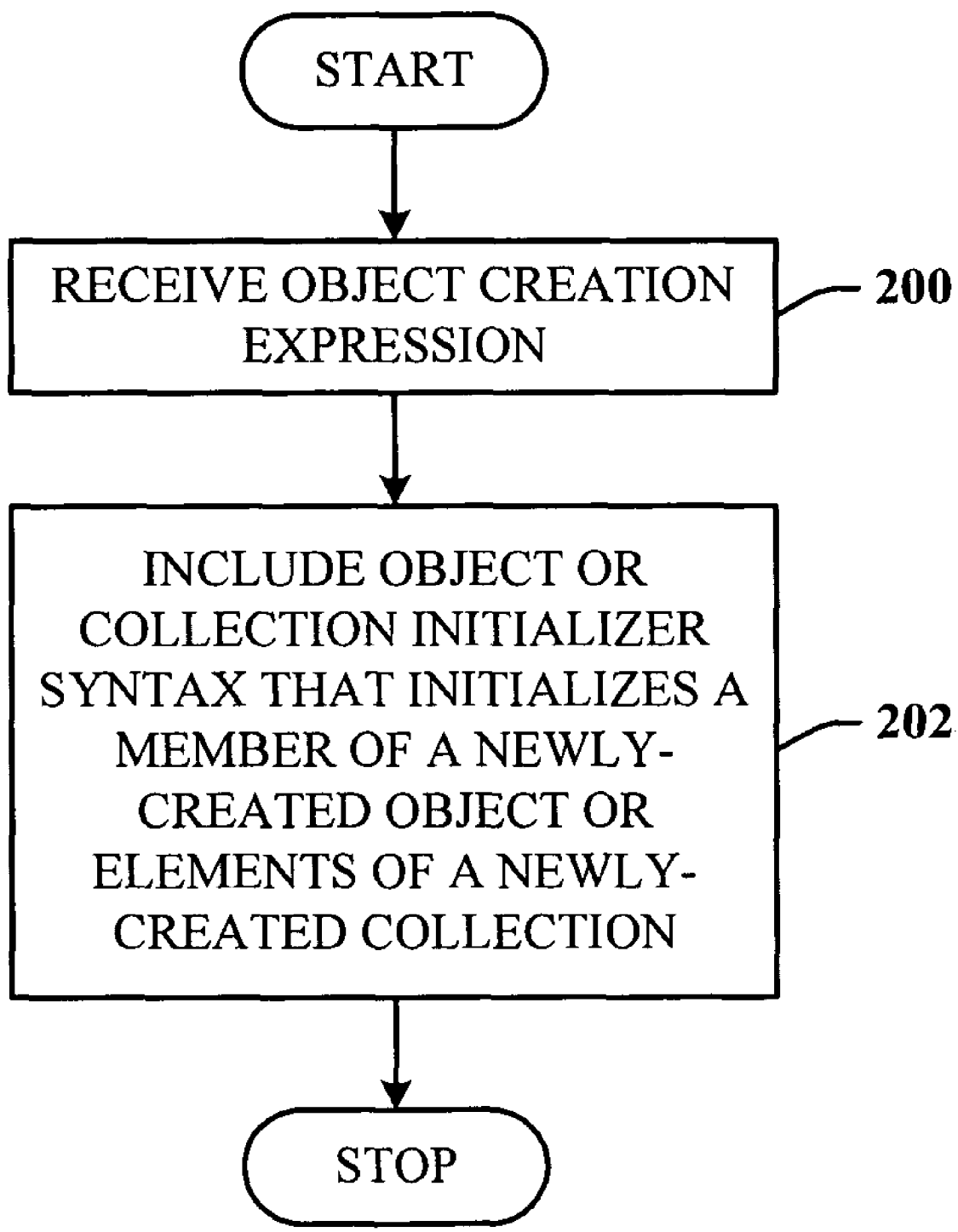
FIG. 2 illustrates a methodology of extending object-creation-expression syntax for the creation of object instances in accordance with the disclosed innovation.

FIG. 2 illustrates a methodology of extending object-creation-expression syntax for the creation of object instances in accordance with the disclosed innovation. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, an object creation expression is received. At 202, optional object-or-collection-initializer syntax is included that initializes a member of a newly-created objects or elements of a newly-created collection.

An object-creation-expression can omit the optional constructor argument list and enclosing parentheses provided it includes the object-or-collection-initializer. Omitting the constructor argument list and enclosing parentheses as in new Button{BackColor=Color.Red} is equivalent to specifying an empty argument list as in new Button( ){BackColor=Color.Red}.

Figure 3:
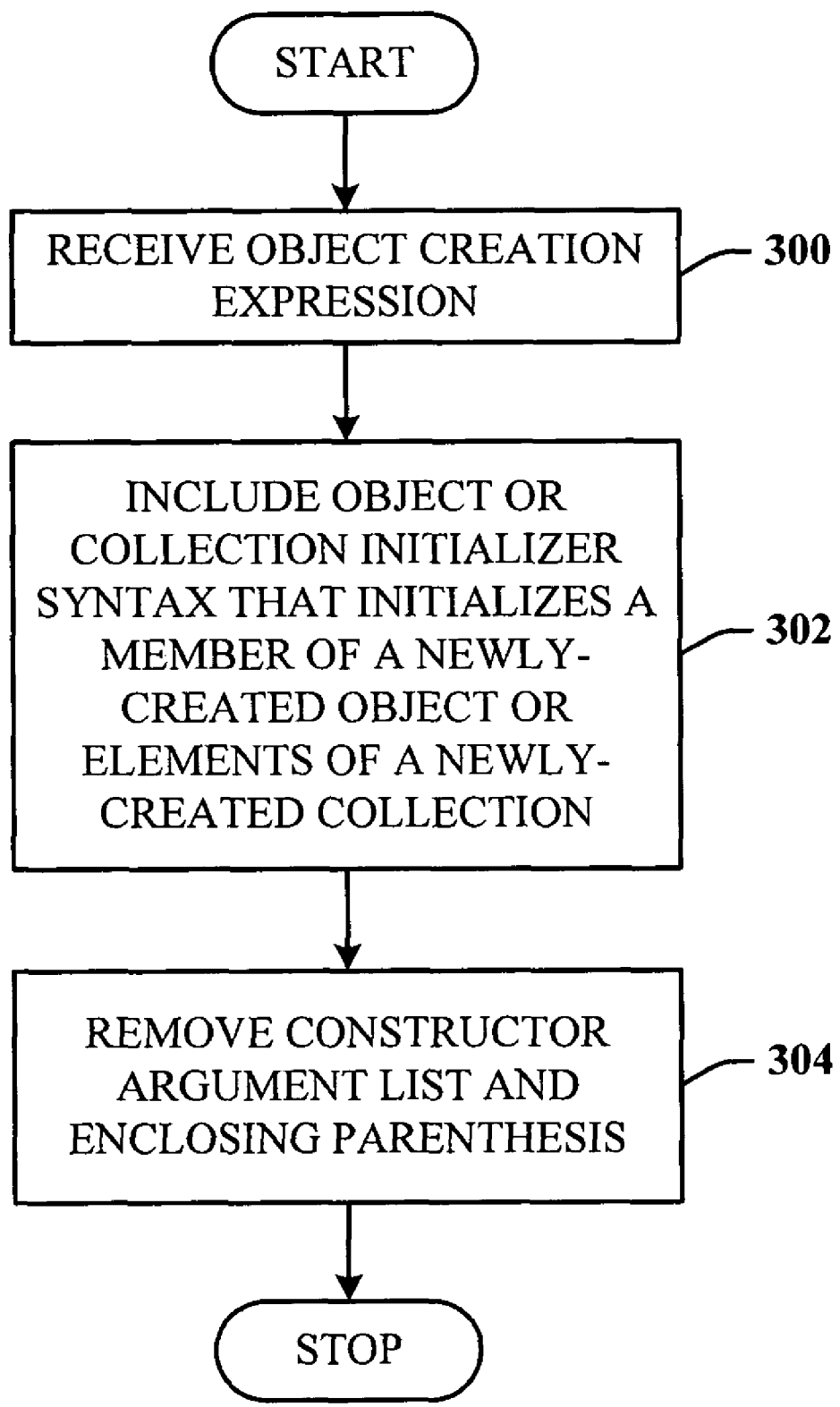
FIG. 3 illustrates an alternative methodology of extending object-creation-expression syntax for the creation of object instances in accordance with the disclosed innovation.

Accordingly, FIG. 3 illustrates an alternative methodology of extending object-creation-expression syntax for the creation of object instances in accordance with the disclosed innovation. At 300, an object-creation-expression is received with a constructor argument list. At 302, object-or-collection-initializer syntax is included that initializes a member of a newly-created objects or elements of a newly-created collection. At 304, remove the constructor argument list and enclosing parenthesis, if the object-or-collection-initializer syntax is included.

FIG. 4 illustrates an exemplary extended syntax in accordance with an aspect of the innovation. This example includes a constructor argument list and an object-or-collection-initializer syntax.

FIG. 5 illustrates an exemplary syntax without the constructor argument list in accordance with an aspect. As indicated supra, if the expression includes the object-or-collection-initializer syntax, the optional constructor argument list can be omitted.

FIG. 6 illustrates an exemplary extended syntax that employs optional object-initializer syntax in accordance with an aspect.

FIG. 7 illustrates an exemplary extended syntax that employs optional collection-initializer syntax in accordance with an aspect.

FIG. 8 illustrates an exemplary extended syntax that employs optional object-and-collection-initializer syntax in accordance with an aspect.

As can be seen, these are only but a few of the variations on the extended syntax which can be employed to create new instances in accordance with the innovative architecture.

Collection and object initializers can be nested to any depth, making it possible to instantiate entire object graphs in a single expression. However, because it is not possible for object or collection initializers to refer to the objects being initialized, only non-cyclic object graphs can be instantiated directly in this fashion. Note that if the type has no accessible parameterless constructor, a compile-time error occurs.

An object initializer specifies values for one or more fields or properties of a newly-created object. FIG. 9 illustrates exemplary syntax for an object initializer and member initializer.

```
object-initializer:
    { member-initializer-list_{opt} }
    { member-initializer-list , }
member-initializer-list:
    member-initializer
    member-initializer-list , member-initializer
member-initializer:
    simple-name
    member-access
    identifier = initializer-value
initializer-value:
    expression
    object-or-collection-initializer
```

Figure 10:
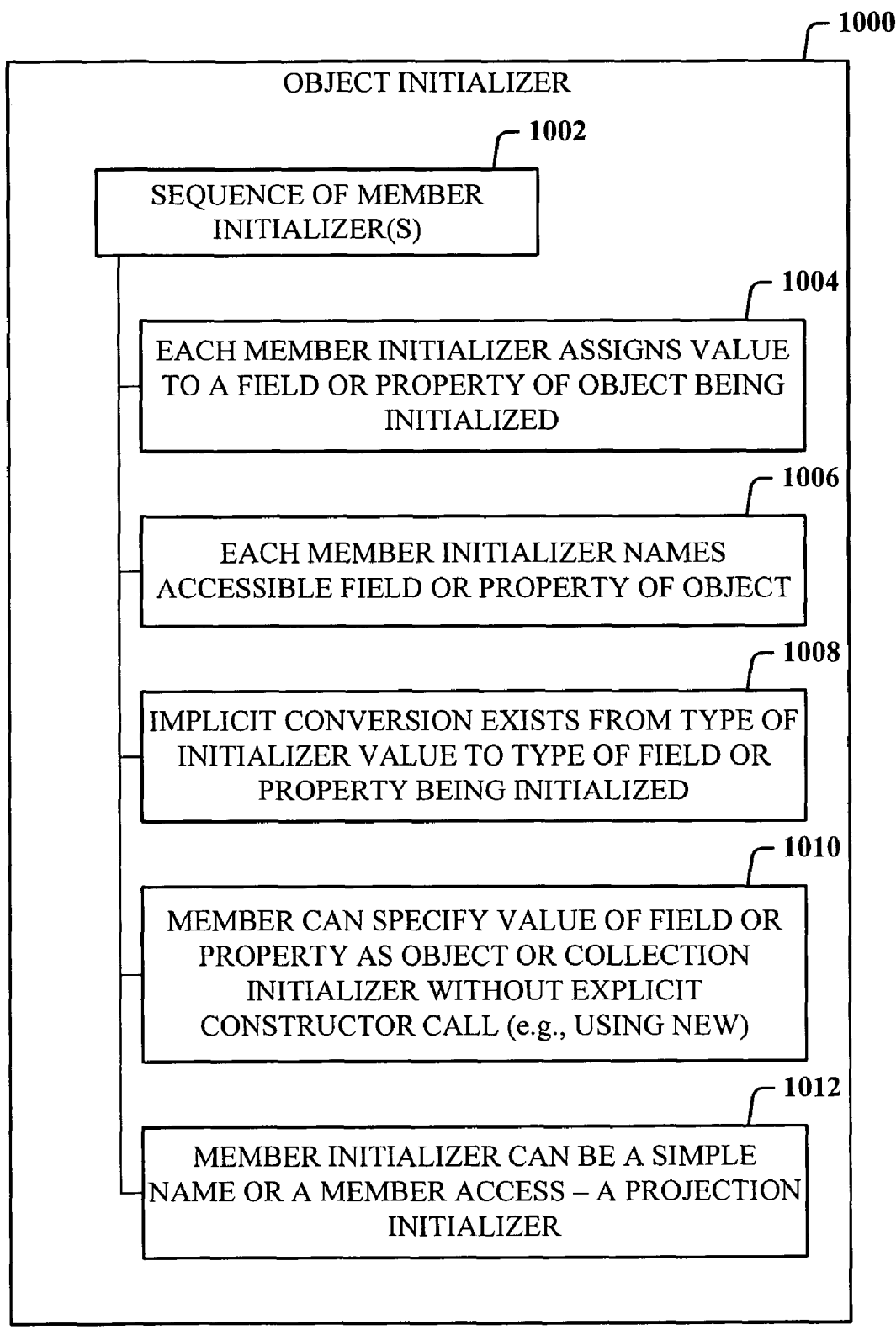
FIG. 10 illustrates some innovative features of an object initializer and member initializers included therein.

FIG. 10 illustrates some innovative features of an object initializer 1000 and member initializers 1002 included therein. The object initializer 1000 consists of a sequence of member initializers 1002, enclosed by { and } tokens and separated by commas. Each member initializer 1002 assigns a value to a field or property of the object being initialized, as indicated by 1004. The examples that follow make reference to two classes, Point and Rectangle:

```
public class Point
{
    public int x, y;
}
public class Rectangle
{
    public Point p1, p2;
}
```

Examples of object initializers for Point and Rectangle are:

```
var a = new Point { x = 0, y = 1 };
var b = new Point { x = 2, y = 3 };
var r = new Rectangle { p1 = a, p2 = b };
```

Another feature is that each member initializer within an object initializer names an accessible field or property of the object, as indicated at 1006. At feature 1008, an implicit conversion exists from the type of the initializer value to the type of the field or property being initialized.

Figure 11:
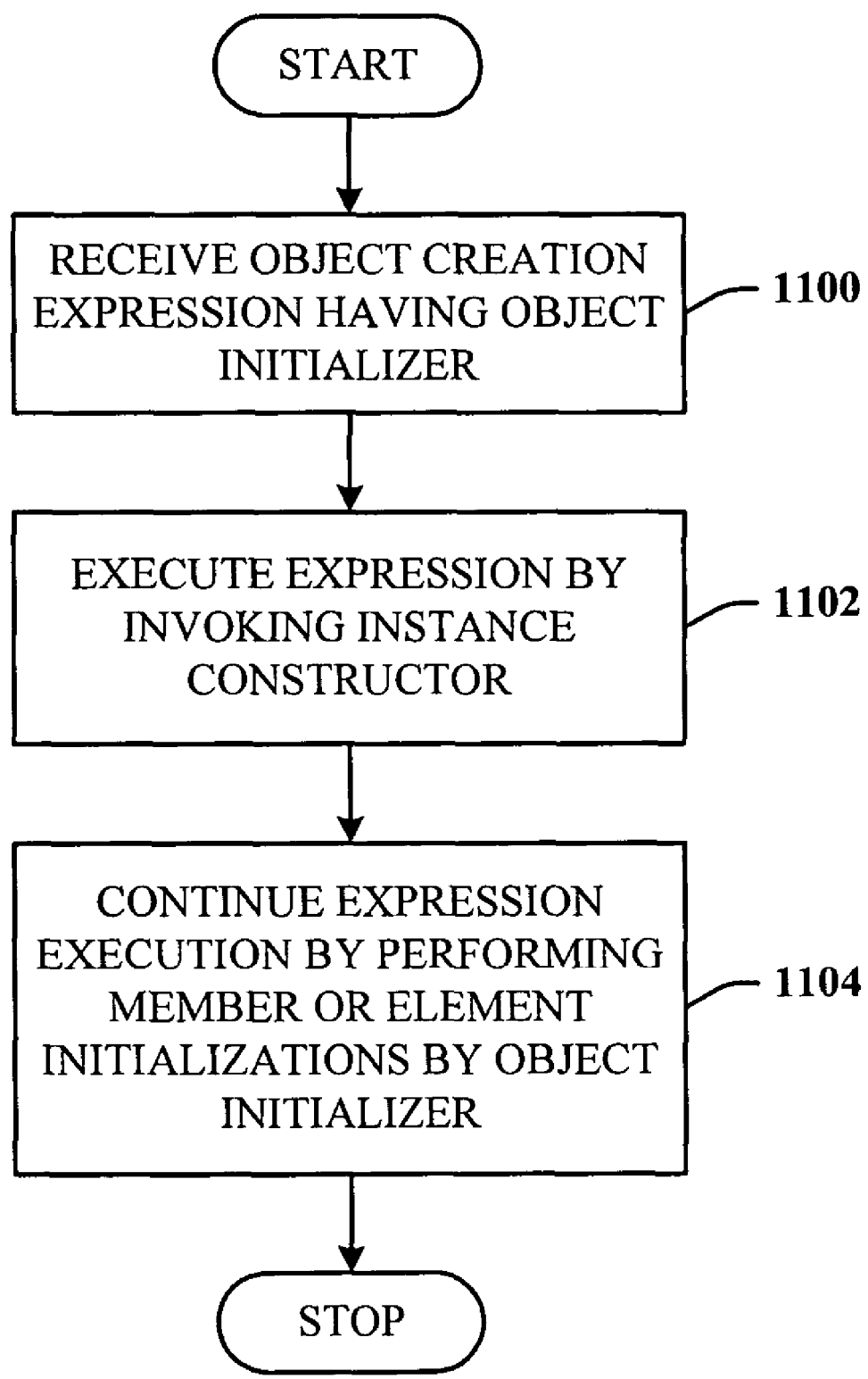
FIG. 11 illustrates a methodology of executing an object-creation-expression that includes an object initializer.

Execution of an object-creation-expression that includes an object initializer consists of first invoking the instance constructor and then performing the member or element initializations specified by the object initializer. Accordingly, FIG. 11 illustrates a methodology of executing an object-creation-expression that includes an object initializer. At 1100, an object-creation-expression is received having syntax for an object initializer. At 1102, expression execution begins by invoking an instance constructor. At 1104, execution continues by performing member or element initializations specified by the object initializer.

For example, execution of the assignment var a=new Point{x=0, y=1}; is equivalent to the following sequence of statements:

```
var a = new Point( );
a.x = 0;
a.y = 1;
```

Feature 1010 of the object initializer 1000 of FIG. 10 indicates that a member initializer can specify the value of a field or property as an object or collection initializer without an explicit constructor call using new. This creates an object of the field or property determined by the static type of that field or property by invoking that type's parameterless constructor. In other words, a member initializer of the form m=object-or-collection-initializer where m has type c is shorthand for the member initializer m=new C( )object-or-collection-initializer. For example, since the types of the members p1 and p2 are Point, the initializer

```
var r = new Rectangle { p1 = { x = 0, y = 1 }, p2 = { x = 2, y = 3 } };
``` is precisely equivalent to the sequence of statements,

```
var r = new Rectangle {
    p1 = new Point { x = 0, y = 1 },
    p2 = new Point { x = 2, y = 3 }
};
```

A member initializer may be a simple name or a member access, as indicated at 1012 of FIG. 10. This is called a projection initializer and is shorthand for an assignment to a field or property with the same name. Specifically, member initializers of the forms

```
identifier        expr . identifier
``` are precisely equivalent to the following, respectively:

```
identifer = identifier    identifier = expr . identifier
```

Thus, in a projection initializer the identifier selects both the value to assign and the field or property to assign it to. Projection initializers are particularly useful in conjunction with anonymous types described in an upcoming pre-disclosure. For example, the sequence of assignments

```
var x = 47; var y = 11;
var p1 = new Point { x, y };
var p2 = new Point { p1.x, p1.y };
``` is precisely equivalent to the assignments,

```
var x = 47; var y = 11;
var p1 = new Point { x = x, y = y };
var p2 = new Point { x = p1.x, y = p1.y };
```

FIG. 12 illustrates exemplary syntax for a collection initializer and element initializer.

```
collection-initializer:
    { element-initializer-list_opt }
    { element-initializer-list , }
element-initializer-list:
    element-initializer
    element-initializer-list , element-initializer
element-initializer:
    initializer-value
```

Figure 13:
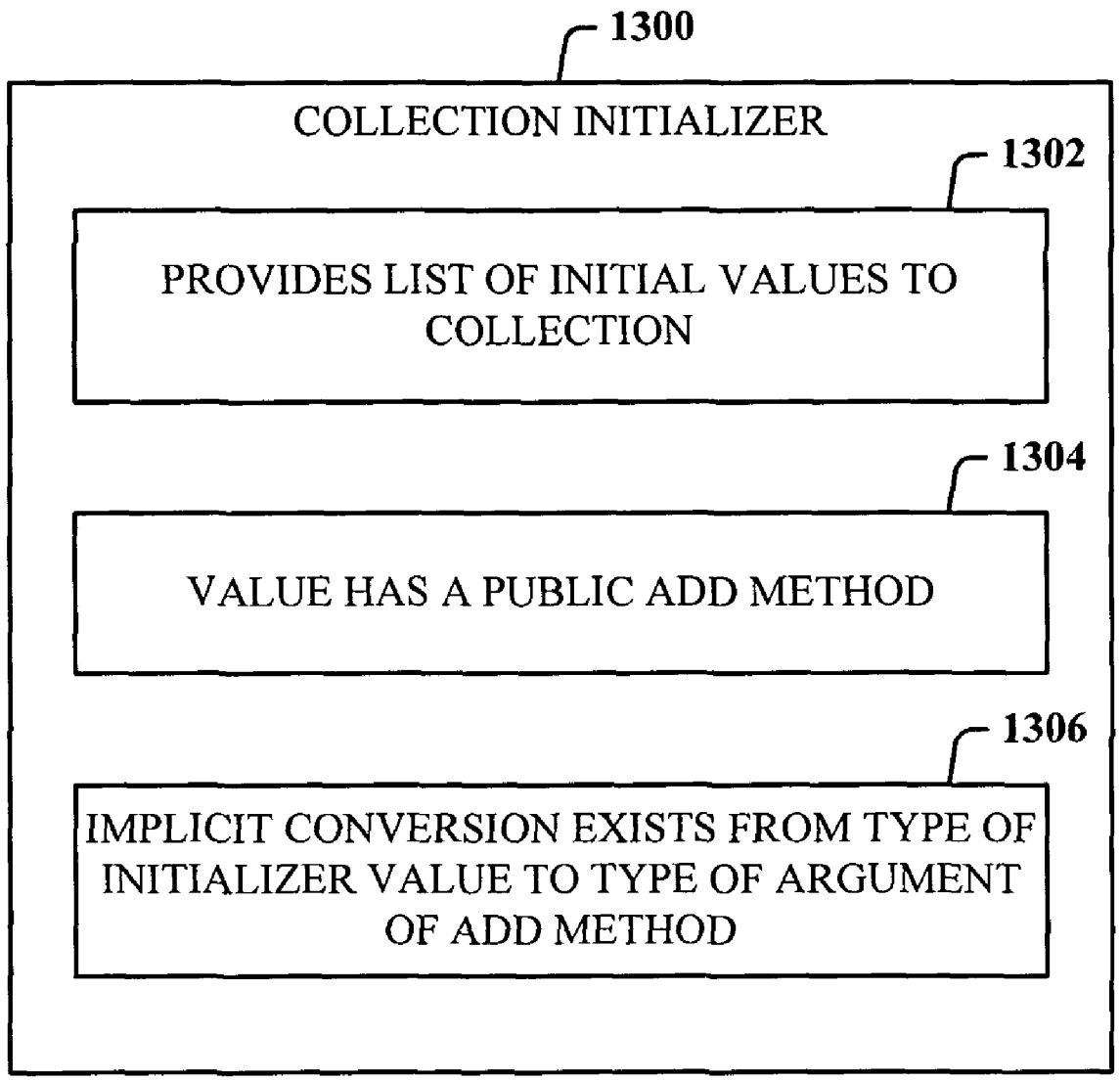
FIG. 13 illustrates some innovative features of a collection initializer.

FIG. 13 illustrates some innovative features of a collection initializer 1300. A collection initializer provides a list of initial values for a collection, as indicated at feature 1302. Feature 1304 indicates that the type of the value to which the initializer is applied has a public Add( ) method or the logical equivalent thereof that allows adding elements to the collection. In other words, the method used to add the value to the collection is done via a public method on the collection type. Additionally, an implicit conversion exists from the type of the initializer values to the type of the argument of the Add method, as indicated at feature 1306.

Execution of an object creation expression that includes a collection initializer consists of first invoking the instance constructor and then adding the values specified by the collection initializer to that collection. For example, the following assignment,

```
var ss = new List<string> { "hello", "world" };
``` is equivalent to the following sequence of assignments,

```
var ss = new List<string>( );
ss.Add("hello"); ss.Add("world");
``` suppose type Dictionary<S,T> supported an Add (KeyValuePair<S,T>) method. In that case, it could be written that,

```
var d =
    new Dictionary<int, string>{ { Key=0, Value="zero"}, { Key=1, Value="one"} };
``` which would mean exactly the same as the sequence of statements,

```
var d = new Dictionary<int, string>( );
var a = new KeyValuePair( ); a.Key = 0; a.Value = "zero";
d.Add(a);
var b = new KeyValuePair( ); a.Key = 1; a.Value = "one";
d.Add(b);
```

Figure 14:
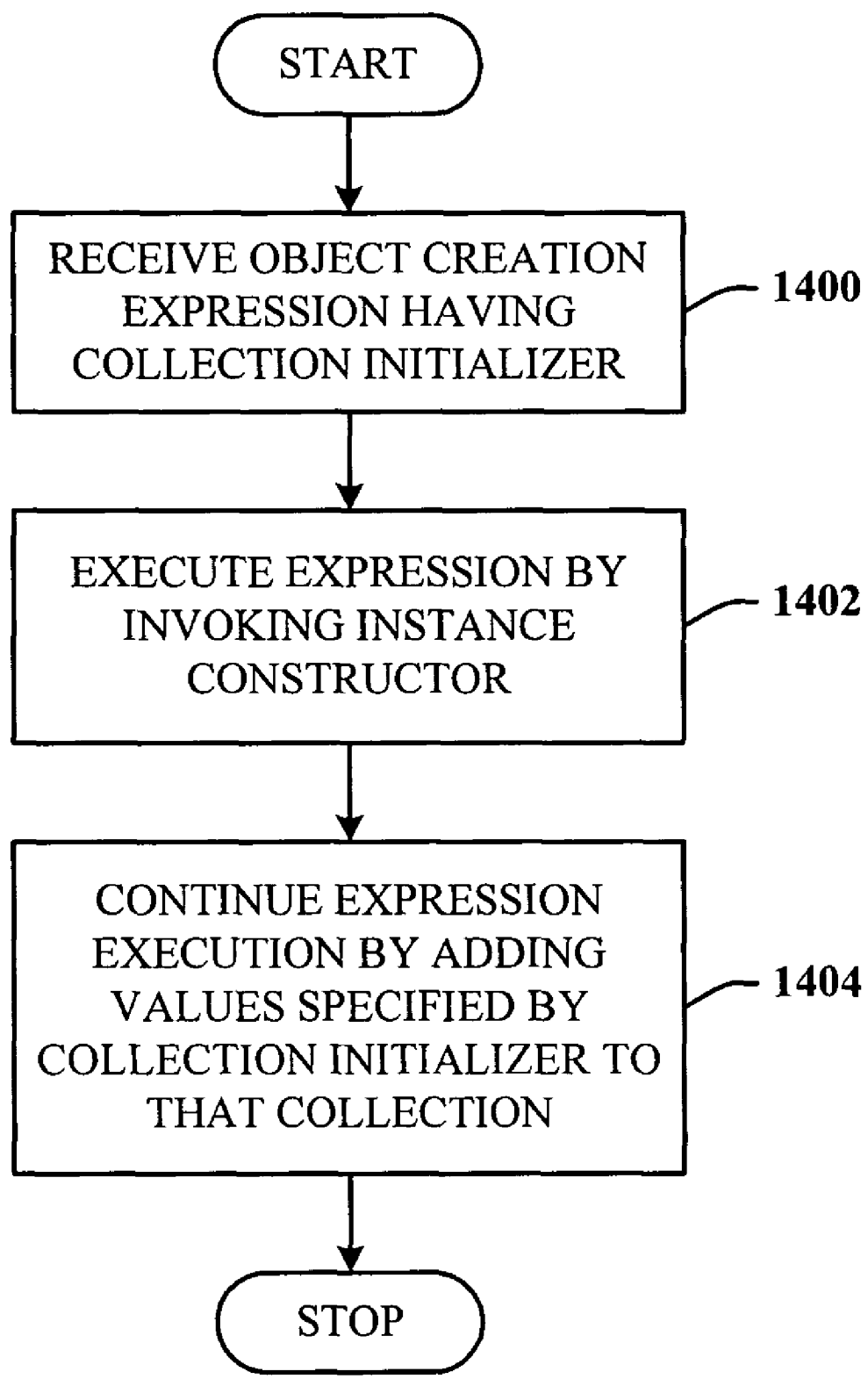
FIG. 14 illustrates a methodology of executing an object-creation-expression that includes a collection initializer.

Accordingly, FIG. 14 illustrates a methodology of executing an object-creation-expression that includes a collection initializer. At 1400, an object-creation-expression is received having syntax for a collection initializer. At 1402, expression execution begins by invoking an instance constructor. At 1404, execution continues by adding values specified by the collection initializer to that collection.

Figures 15, 16:
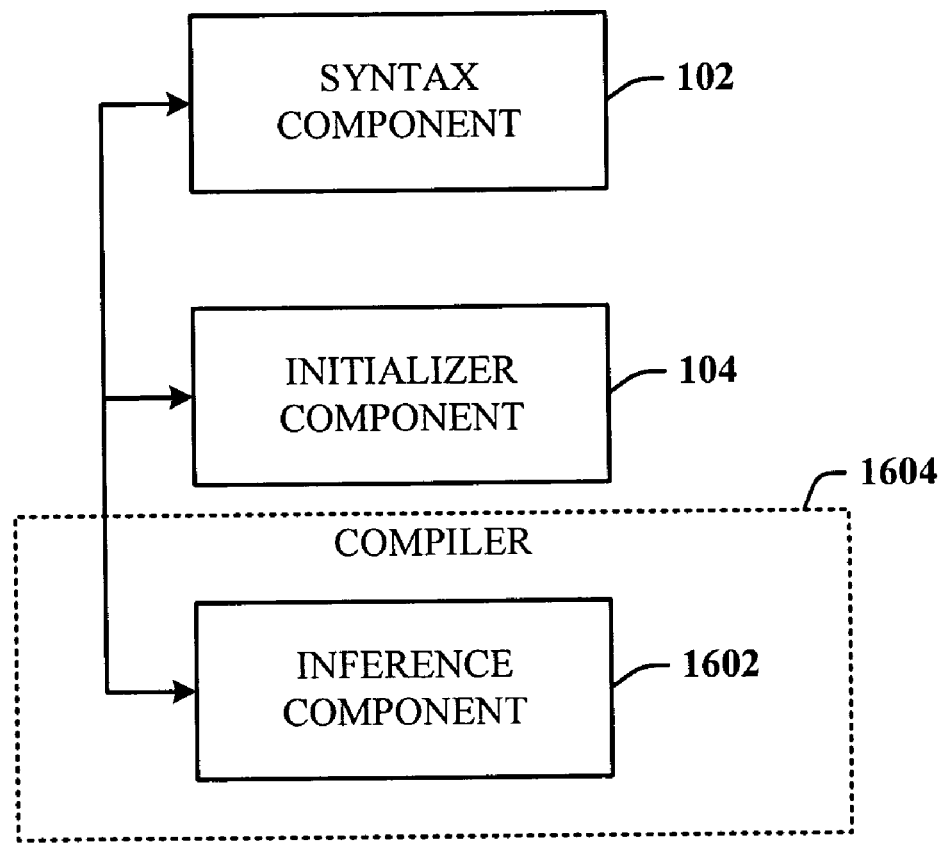
FIG. 15 illustrates syntax for a context for an array initializer that now permits a collection initializer.
FIG. 16 illustrates a system that includes an inference component in accordance with an innovative aspect.

FIG. 15 illustrates syntax for a context for an array initializer that now permits a collection initializer. Any context that previously permitted an array initializer now instead permits a collection initializer:

```
array-initializer:
    collection-initializer
```

FIG. 16 illustrates a system 1600 that includes an inference component 1602 in accordance with an innovative aspect. Code inference via the inference component 1602 is disclosed whereby given type information as part of an expression, the corresponding code can be inferred. This is an innovative and useful tool whenever explicit creation is complex or tedious. The inference component 1602 is illustrated as part of a compiler 1604, which inference component 1602 can interface to the syntax component 102 and the initializer component 104 such that when type information is received, the code can be inferred therefrom. Alternatively, the inference component 1602 can be implemented external to the compiler 1604 and provide the same or similar capabilities.

Figure 17:
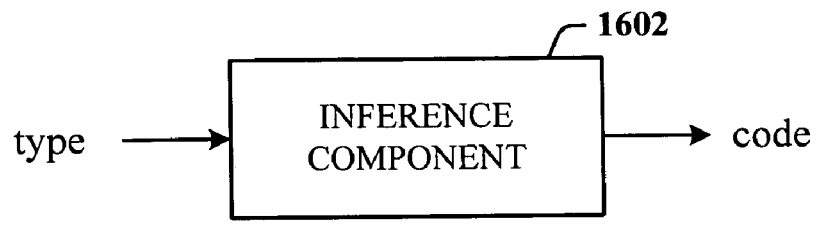
FIG. 17 illustrates the inference component of FIG. 16 processing a type input and outputting code inferred by the input type.

FIG. 17 illustrates the inference component 1602 of FIG. 16 processing a type input and outputting code inferred by the input type. Code inference allows code to be written in an extremely compressed form.

Figure 18:
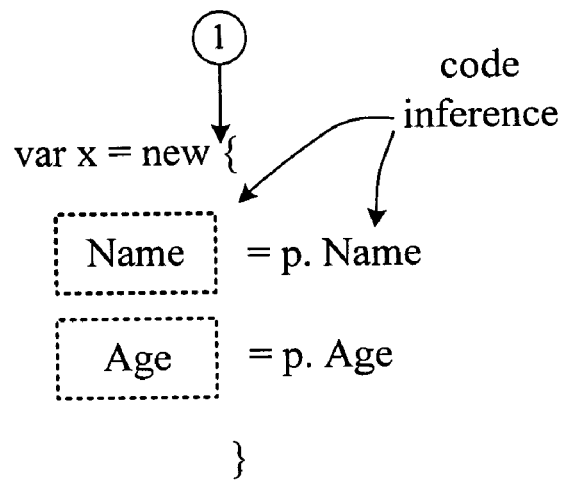
FIG. 18 illustrates an exemplary code inference process.

FIG. 18 illustrates an exemplary code inference process. Here, code inference is applied to p.Name and p.Age to infer the code Name and Age (within the dotted box) on the other side of an equals sign. Additionally, is it does not matter that a nominal type or anonymous type is included at position ①.

Figure 19:
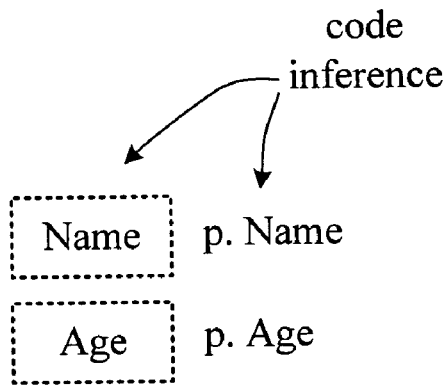
FIG. 19 illustrates another exemplary code inference process.

FIG. 19 illustrates another exemplary code inference process. Here, code inference is applied to p. Name and p. Age to infer the code Name and Age (within the dotted box).

Figure 20:
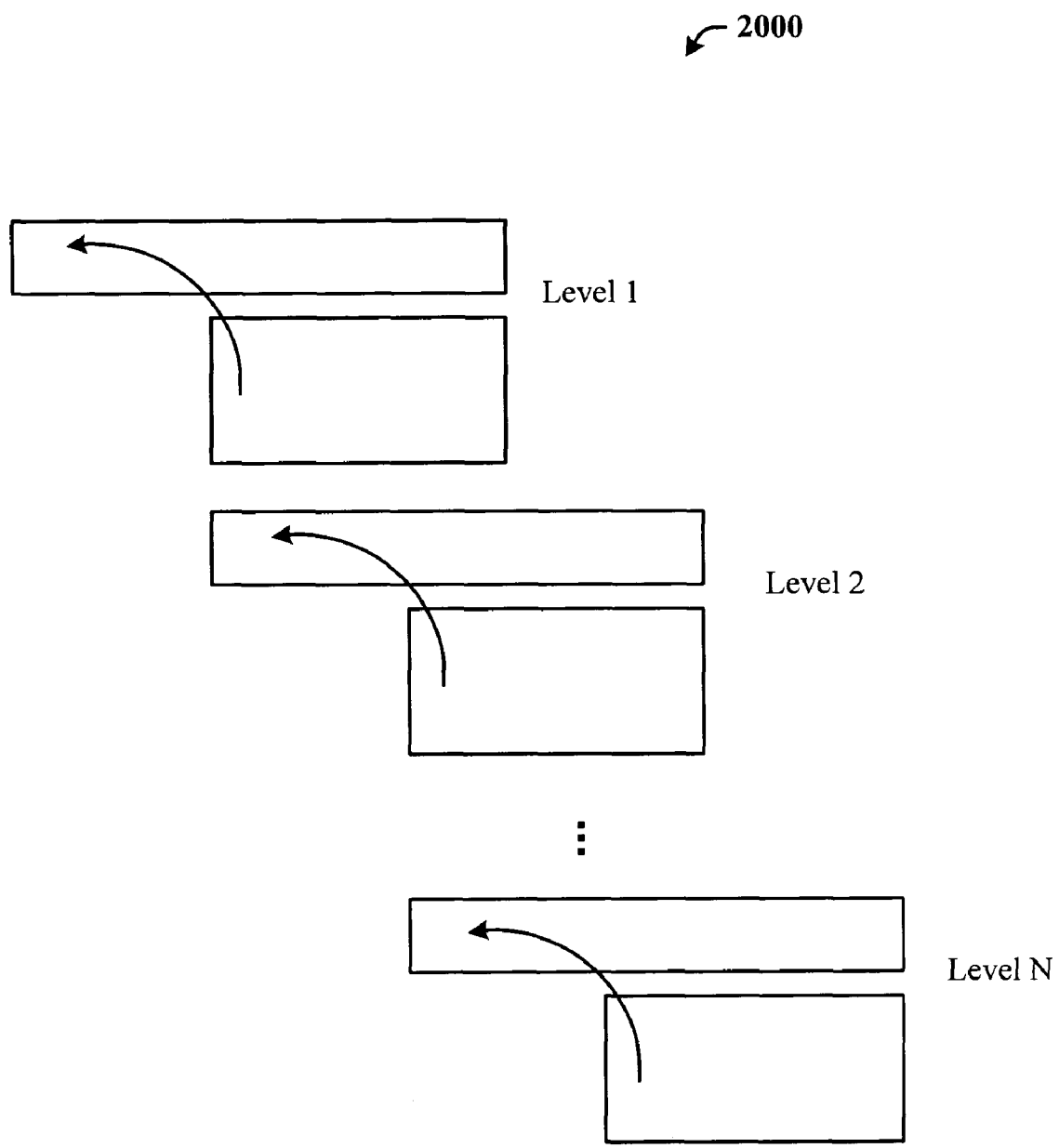
FIG. 20 illustrates an exemplary code inference application to embedded levels of type information.

FIG. 20 illustrates an exemplary code inference application to embedded levels 2000 of type information. Here, there are depicted N levels (denoted Level 1, Level 2, . . . , Level N) of embedded type information, where N is an integer. Accordingly, code inference can be applied individually at each level to infer additional code from the embedded type information at that level. Additionally, it can be appreciated that code that is inferred from a lower level can form the basis for code to be inferred at an upper level.

Figure 21:
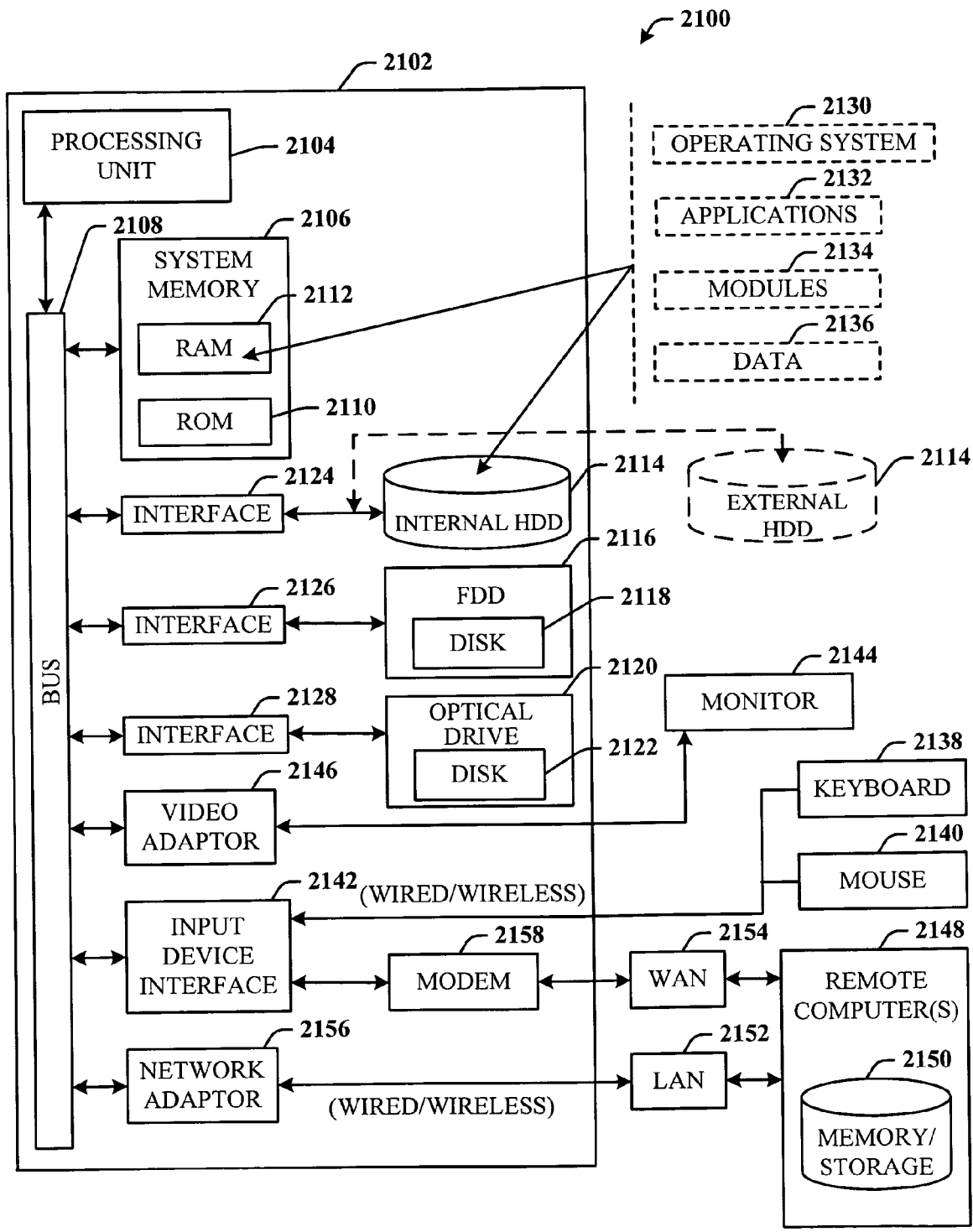
FIG. 21 illustrates a block diagram of a computer operable to execute programming language in accordance with innovative aspects of the disclosed architecture.

Referring now to FIG. 21, there is illustrated a block diagram of a computer operable to execute programming language in accordance with innovative aspects of the disclosed architecture. In order to provide additional context for various aspects thereof, FIG. 21 and the following discussion are intended to provide a brief, general description of a suitable computing environment 2100 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 21, the exemplary environment 2100 for implementing various aspects includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures may also be employed as the processing unit 2104.

The system bus 2108 can be any of several types of bus structure that may further interconnect to a memory bus (with or without a memory controller), a peripheral bus, and a local bus using any of a variety of commercially available bus architectures. The system memory 2106 includes read-only memory (ROM) 2110 and random access memory (RAM) 2112. A basic input/output system (BIOS) is stored in a non-volatile memory 2110 such as ROM, EPROM, EEPROM, which BIOS contains the basic routines that help to transfer information between elements within the computer 2102, such as during start-up. The RAM 2112 can also include a high-speed RAM such as static RAM for caching data.

The computer 2102 further includes an internal hard disk drive (HDD) 2114 (e.g., EIDE, SATA), which internal hard disk drive 2114 may also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 2122 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface 2128, respectively. The interface 2124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. It is to be appreciated that the innovation can be implemented with various commercially available operating systems or combinations of operating systems.

A user can enter commands and information into the computer 2102 through one or more wired/wireless input devices, e.g., a keyboard 2138 and a pointing device, such as a mouse 2140. Other input devices (not shown) may include a microphone, an IR remote control, a joystick, a game pad, a stylus pen, touch screen, or the like. These and other input devices are often connected to the processing unit 2104 through an input device interface 2142 that is coupled to the system bus 2108, but can be connected by other interfaces, such as a parallel port, an IEEE 1394 serial port, a game port, a USB port, an IR interface, etc.

A monitor 2144 or other type of display device is also connected to the system bus 2108 via an interface, such as a video adapter 2146. In addition to the monitor 2144, a computer typically includes other peripheral output devices (not shown), such as speakers, printers, etc.

The computer 2102 may operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which may connect to a global communications network, e.g., the Internet.

When used in a LAN networking environment, the computer 2102 is connected to the local network 2152 through a wired and/or wireless communication network interface or adapter 2156. The adaptor 2156 may facilitate wired or wireless communication to the LAN 2152, which may also include a wireless access point disposed thereon for communicating with the wireless adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wired or wireless device, is connected to the system bus 2108 via the serial port interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

The computer 2102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 22:
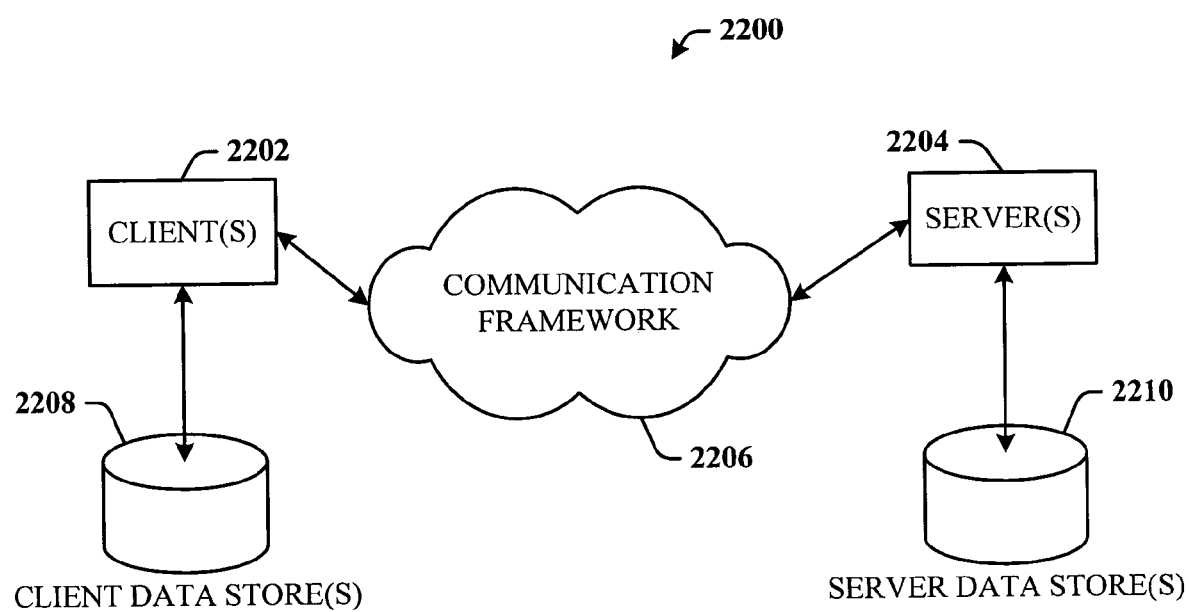
FIG. 22 illustrates a schematic block diagram of an exemplary computing environment that facilitates the programming language aspects of the subject invention.

Referring now to FIG. 22, there is illustrated a schematic block diagram of an exemplary computing environment 2200 that facilitates the programming language aspects of the subject invention. The system 2200 includes one or more client(s) 2202. The client(s) 2202 can be hardware and/or software (e.g., threads, processes, computing devices). The client(s) 2202 can house cookie(s) and/or associated contextual information by employing the subject innovation, for example.

The system 2200 also includes one or more server(s) 2204. The server(s) 2204 can also be hardware and/or software (e.g., threads, processes, computing devices). The servers 2204 can house threads to perform transformations by employing the invention, for example. One possible communication between a client 2202 and a server 2204 can be in the form of a data packet adapted to be transmitted between two or more computer processes. The data packet may include a cookie and/or associated contextual information, for example. The system 2200 includes a communication framework 2206 (e.g., a global communication network such as the Internet) that can be employed to facilitate communications between the client(s) 2202 and the server(s) 2204.

Communications can be facilitated via a wired (including optical fiber) and/or wireless technology. The client(s) 2202 are operatively connected to one or more client data store(s) 2208 that can be employed to store information local to the client(s) 2202 (e.g., cookie(s) and/or associated contextual information). Similarly, the server(s) 2204 are operatively connected to one or more server data store(s) 2210 that can be employed to store information local to the servers 2204.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates creation of object instances using expressions, comprising:
    a processor;
    system memory;
    a syntax component executed by the processor that facilitates extension of object-creation-expression syntax, the object-creation-expression syntax comprising computer programming code configured to create an object using a single expression, wherein extension of the object-creation-expression syntax allows object creation that is expression-based such that a developer can implicitly define functionality that is inferable by a code compiler, wherein the extension allows multiple objects to be created on-the-fly within the expression, such that new objects and new object parameters are defined in the same expression, wherein at least one of the new object parameters is passed as a function parameter to a constructor of an object class for implementation by the constructor and wherein at least one of the new object parameters is not configured for passing to the constructor and is not implemented by the constructor; and
    an initializer component that provides for initialization of a newly-created entity using the expression, wherein the initializer component provides initialization of the newly-created entity utilizing an object initializer, wherein the object initializer includes a sequence of member initializers that are assigned to the newly-created entity which is an object; and
    an inference component that facilitates code inference by inferring a code when given a type in the expression.

2. The system of claim 1, wherein the newly-created entity includes at least one of an object and a collection.

3. The system of claim 1, wherein the initializer component provides initialization of the newly-created entity utilizing a collection initializer.

4. The system of claim 3, wherein the collection initializer is employed when an underlying object implements at least one of a predetermined interface and a predetermined pattern and, the at least one of the predetermined interface and predetermined pattern allow for adding elements to a collection.

5. The system of claim 3, wherein the collection initializer includes a sequence of initializer values that are added to the newly-created entity which is collection.

6. The system of claim 1, wherein the initializer component facilitates calling at least one of a default parameterless constructor and a normal overloaded parameterized constructor during the initialization.

7. The system of claim 1, wherein the code inferred includes constructor calls for nested object and collection initializers.

8. The system of claim 1, wherein the code inferred includes member names for projection initializers.

9. The system of claim 1, wherein the type is one of a nominal type and an anonymous type.

10. At a computer system including a processor and system memory, a computer-implemented method of creating an object instance, comprising:
    extending an object-creation-expression syntax using a syntax component to include an object or collection initializer, the object-creation-expression syntax comprising computer programming code configured to create an object using a single expression, wherein extension of the object- creation-expression syntax allows object creation that is expression-based such that a developer can implicitly define functionality that is inferable by a code compiler, wherein the extension allows multiple objects to be created on-the-fly within the expression, such that new objects and new object parameters are defined in the same expression, wherein at least one of the new object parameters is passed as a function parameter to a constructor of an object class for implementation by the constructor and wherein at least one of the new object parameters is not configured for passing to the constructor and is not implemented by the constructor; and initializing at least one of a member of a newly-created object and an element of a newly-created collection using the expression, based on the object or collection initializer, wherein the object initializer includes a sequence of member initializers that are assigned to the newly-created entity which is an object; and inferring a code using an inference component when given a type in the expression.

11. The method of claim 10, further comprising an act of executing the object-creation-expression syntax that includes an object initializer, by acts of, invoking an instance constructor; and performing initializations of at least one of members and elements specified by the object initializer.

12. The method of claim 11, further comprising naming an accessible field or property of an object using the object initializer.

13. The method of claim 10, further comprising an act of executing the object-creation-expression syntax that includes a collection initializer, by acts of, invoking an instance constructor; and adding a value specified by the collection initializer to that newly-created collection.

14. The method of claim 13, wherein a method employed to add the value to the collection is a public method on a collection type.

15. A system that facilitates creation of object instances, comprising:

a processor;

a storing means;

means for extending an expression-based syntax to include an object or collection initializer, the object-creation-expression syntax comprising computer programming code configured to create an object using a single expression, wherein extension of the object- creation-expression syntax allows object creation that is expression-based such that a developer can implicitly define functionality that is inferable by a code compiler, wherein the extension allows multiple objects to be created on-the-fly within the expression, such that new objects and new object parameters are defined in the same expression, wherein at least one of the new object parameters is passed as a function parameter to a constructor of an object class for implementation by the constructor and wherein at least one of the new object parameters is not configured for passing to the constructor and is not implemented by the constructor;

means for initializing at least one of a member of a newly-created object and an element of a newly-created collection using the expression, based on the object or collection initializer, wherein the object initializer includes a sequence of member initializers that are assigned to the newly-created entity which is an object; and means for inferring code when given a type in the expression.

16. A computer-readable storage medium having stored thereon computer-executable instructions for carrying out the method of claim 10.

* * * * *

UNITED STATES PATENT AND TRADEMARK OFFICE
CERTIFICATE OF CORRECTION

| | | |
|---|---|---|
| PATENT NO. | : 7,818,719 B2 | Page 1 of 1 |
| APPLICATION NO. | : 11/193584 | |
| DATED | : October 19, 2010 | |
| INVENTOR(S) | : Henricus Johannes Maria Meijer et al. | |

It is certified that error appears in the above-identified patent and that said Letters Patent is hereby corrected as shown below:

In column 14, line 64, in Claim 10, delete "object- creation" and insert -- object-creation --, therefor.

In column 16, line 9, in Claim 15, delete "object- creation" and insert -- object-creation --, therefor.

Signed and Sealed this
Eighth Day of February, 2011

David J. Kappos
*Director of the United States Patent and Trademark Office*